(No Model.)

H. J. BREWER.
BATTERY CELL.

No. 258,213. Patented May 23, 1882.

UNITED STATES PATENT OFFICE.

HORATIO J. BREWER, OF NEW YORK, N. Y.

BATTERY-CELL.

SPECIFICATION forming part of Letters Patent No. 258,213, dated May 23, 1882.

Application filed April 4, 1882. (No model.)

*To all whom it may concern:*

Be it known that I, HORATIO J. BREWER, of the city, county, and State of New York, have invented a new and useful Improvement in Battery-Cells, of which the following is a full, true, and exact description, reference being had to the accompanying drawings.

My invention relates to a method of preventing the zinc pole of a battery from coming in contact with the other or carbon pole.

In the form of glass cell usually employed in Leclanché batteries an arrangement is made to receive a round or other shaped zinc rod, which zinc rod projects down into the cell alongside of the porous cup or prism. No means are provided for preventing the bottom of the zinc from coming in contact with the bottom of the other pole. I have devised a method by which the configuration of the glass itself holds the bottom of the zinc away from the other pole.

Figure 1:
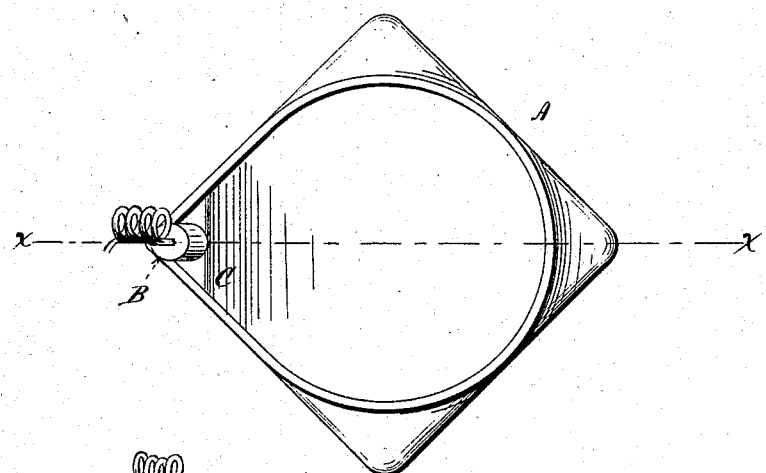
Figure 2:
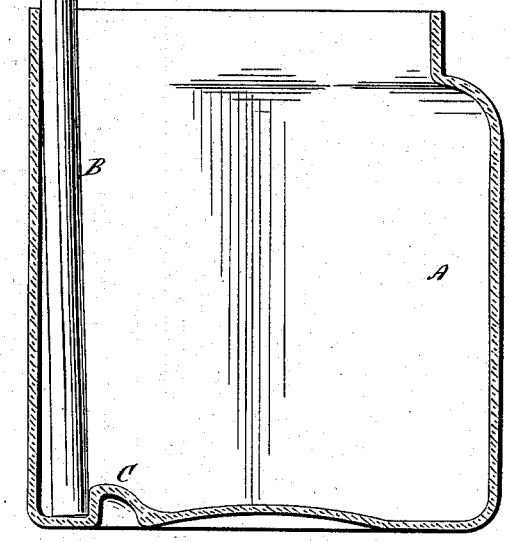

My invention will be readily understood from the accompanying drawings, of which Figure 1 represents a plan or top view; Fig. 2, a section of Fig. 1 on the line $x$ $x$.

A represents a glass cell, in the drawings shown as a square, although a round cell with a projection might be employed.

B represents the zinc, which is placed in one corner of the cell in which the top is not brought in, but the corners are brought up vertically. In the bottom of the cell is molded the rib C, cutting off the corner in which the zinc is placed. When the zinc has been dropped in position between the corner C and the glass of the cell it is plain that the zinc cannot be moved inward and against the carbon pole, while at the same time the rib C prevents the carbon pole from being moved toward the zinc.

What I claim as my invention, and desire to secure by Letters Patent, is—

A battery-cell having a bottom provided with a rib or elevation adapted to hold the bottom of the zinc away from the other pole, substantially as described.

HORATIO J. BREWER.

Witnesses:
 GEO. H. EVANS,
 ANTHONY GREF, Jr.